(12) United States Patent
Kedem et al.

(10) Patent No.: US 10,461,828 B2
(45) Date of Patent: Oct. 29, 2019

(54) MILLIMETER WAVE DISTRIBUTED NETWORK ANTENNA SECTOR SWITCH

(71) Applicant: Intel IP Corporation, Santa Clara, CA (US)

(72) Inventors: Oren Kedem, Modiin Maccabim-Reut (IL); Carlos Cordeiro, Portland, OR (US); Michael Glik, Kfar Saba (IL); Elad Levy, Rishon Le Zion (IL); Igor Brainman, Kfar Saba (IL); Cheng Chen, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/230,611

(22) Filed: Dec. 21, 2018

(65) Prior Publication Data

US 2019/0115961 A1   Apr. 18, 2019

Related U.S. Application Data

(60) Provisional application No. 62/610,857, filed on Dec. 27, 2017.

(51) Int. Cl.
| | |
|---|---|
| *H04B 7/0491* | (2017.01) |
| *H04B 1/44* | (2006.01) |
| *H04L 1/16* | (2006.01) |
| *H04L 5/14* | (2006.01) |
| *H04B 7/06* | (2006.01) |

(52) U.S. Cl.
CPC ........... *H04B 7/0491* (2013.01); *H04B 1/44* (2013.01); *H04B 7/0617* (2013.01); *H04L 1/1607* (2013.01); *H04L 5/14* (2013.01)

(58) Field of Classification Search
CPC .. H04B 7/0408; H04B 7/0491; H04B 7/0602; H04B 7/061
See application file for complete search history.

(56) References Cited

U.S. PATENT DOCUMENTS

2004/0196834 A1 * 10/2004 Ofek ................... H01Q 1/246
                                                              370/352
2005/0122931 A1 *  6/2005 Kado ................... H04W 88/04
                                                              370/328

(Continued)

*Primary Examiner* — Kevin Kim
(74) *Attorney, Agent, or Firm* — Eversheds Sutherland (US) LLP

(57) ABSTRACT

This disclosure describes systems, methods, and devices related to a time division duplex (TDD) antenna sector switch. A device may determine one or more antenna sector configurations based on TDD beamforming, wherein the one or more antenna sector configurations are associated with first antenna sectors used to communicate with a first station device (STA). The device may initiate a TDD sector switch with the first STA to switch from the one or more first antenna sectors to one or more second antenna sectors. The device may cause to send, to the first STA, an action frame comprising TDD sector setting parameters associated with the TDD sector switch. The device may identify a response frame received from the first STA, wherein the response frame comprises the TDD sector setting parameters. The device may perform the TDD sector switch by switching from the one or more first antenna sectors to the one or more second antenna sectors.

20 Claims, 6 Drawing Sheets

(56) References Cited

U.S. PATENT DOCUMENTS

| | | | | |
|---|---|---|---|---|
| 2006/0258402 | A1* | 11/2006 | Guillouard | H04B 7/0491 455/562.1 |
| 2008/0287163 | A1* | 11/2008 | Skarby | H04W 88/08 455/562.1 |
| 2009/0046010 | A1* | 2/2009 | Niu | H04B 7/0691 342/373 |
| 2009/0274130 | A1* | 11/2009 | Boch | H01Q 1/125 370/338 |

* cited by examiner

MILLIMETER WAVE DISTRIBUTED NETWORK ANTENNA SECTOR SWITCH

CROSS-REFERENCE TO RELATED APPLICATION(S)

This application claims the benefit of U.S. Provisional Application No. 62/610,857, filed Dec. 27, 2017, the disclosure of which is incorporated herein by reference as if set forth in full.

TECHNICAL FIELD

This disclosure generally relates to systems and methods for wireless communications and, more particularly, to a millimeter wave (mmWave) distributed network antenna sector switch.

BACKGROUND

Wireless devices are becoming widely prevalent and are increasingly requesting access to wireless channels. The growing density of wireless deployments requires increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

DETAILED DESCRIPTION

Figure 1:
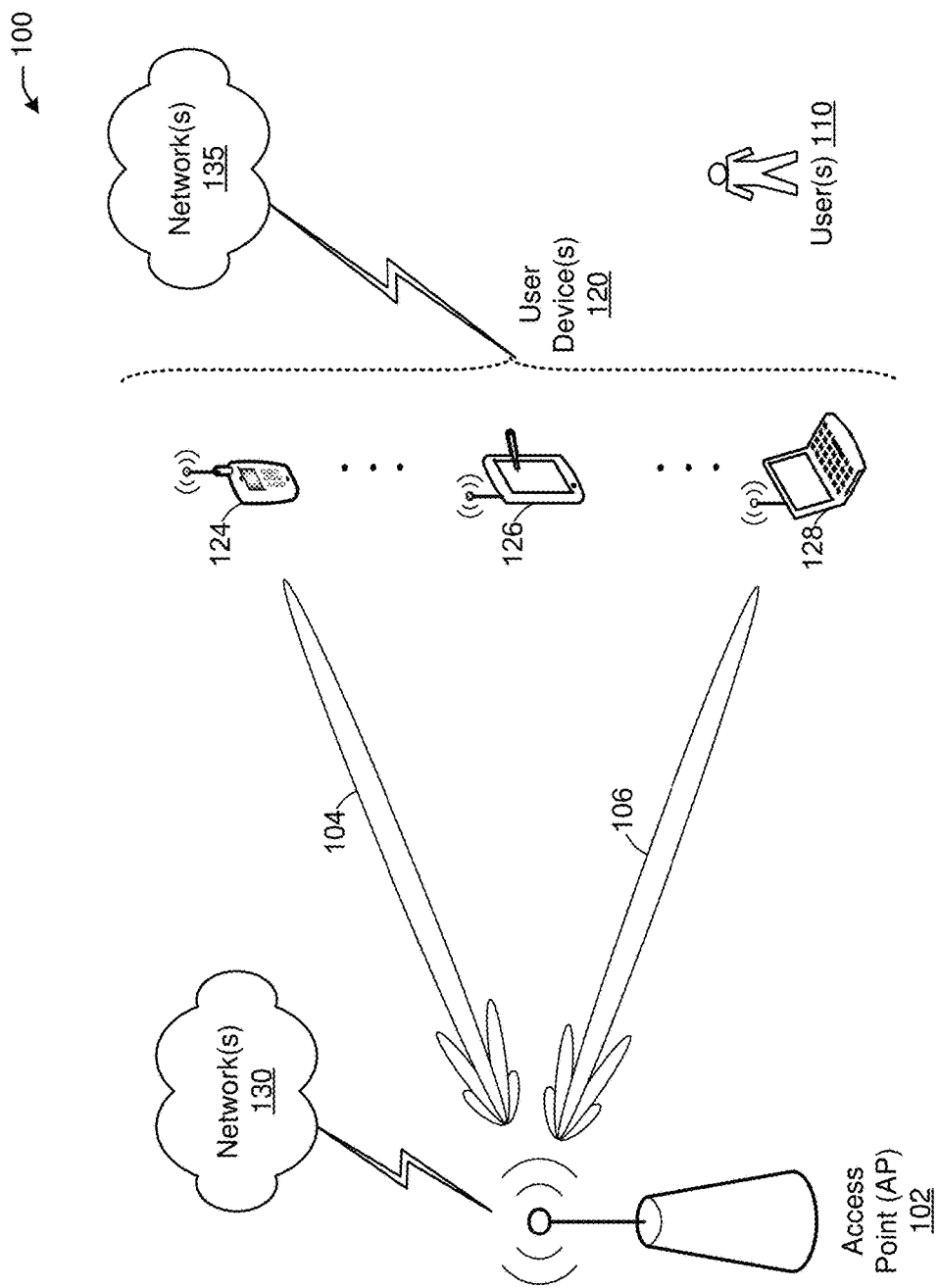
FIG. 1 is a network diagram illustrating an example network environment for a time division duplex (TDD) antenna sector switch system, in accordance with one or more example embodiments of the present disclosure.

Example embodiments described herein provide certain systems, methods, and devices for an mmWave distributed network antenna sector switch for time division duplex (TDD) network architectures. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or access points (APs) or other devices capable of communicating in accordance with a communication standard.

IEEE 802.11ay makes use of the unlicensed 60 GHz mmWave frequency band. The large bandwidth availability and its directional propagation nature make it very attractive for service providers that want to deliver high-speed internet to enterprises, small-to medium-sized businesses (SMBs), homes, etc., through a fixed wireless access (FWA) distribution network. This kind of network is built with many nodes communicating with each other and creating a distributed mesh network. The method accepted into 802.11ay to allocate link access in those controlled networks is by dividing the medium between uplink and downlink slots and further dividing each of the slots into several TDD-SPs (time division duplex service periods). The TDD-SPs (also known as TDD slots) are allocated to different stations allowing the controlled link access to be managed by a central server and operator. In each of the TDD-SPs, a station may transmit or receive but not both. This method of allocating the medium helps to mitigate interferences among stations. This method is also known as TDD (time division duplex). A typical FWA network is deployed in an outdoor environment which requires nodes to establish links at a relatively long distance. In order to achieve a long distance communication link, high antennas and beamforming are used on both sides of the link. The method in which both of the communicating nodes adjust their directive beams toward each other is referred to as beamforming. In the process of performing beamforming in controlled networks, the communicating peers test many of their antenna sectors with the peer sectors and decide on the preferred combination for ongoing communications. However, there are cases where one of the peers wants to change its antenna sector configuration when communicating with its peer. Such action could be triggered from interferences on the current sector configuration, network management consideration, coexistence issues, etc. Hence, there is a need to develop a sector switch procedure for TDD networks. In 802.11ad, two devices can switch their antenna configurations only based on the last results of the beamforming procedure. A peer cannot negotiate on the sectors to be utilized nor to request a peer to switch its antenna sectors.

There may be proprietary implementations that perform this kind of sector switch; however, they are not standardized and may utilize a very specific network configuration and parameters. Hence, they are not robust and do not provide a solution to a generic TDD network configuration.

Example embodiments of the present disclosure relate to systems, methods, and devices for an mmWave distributed network antenna sector switch for TDD network architectures.

A directional multi-gigabyte (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG)

network, and/or any other network. For example, the one or more devices may be configured to communicate over the NG60 or EDMG networks.

In one embodiment, a TDD antenna sector switch system may pair DMG STAs operating in an SP with TDD channel access to synchronize the switch of transmit and receive sectors for communication between them. The DMG STA can make use of the information achieved during the TDD beamforming procedure or the results of measurements undertaken by the STAs in the basic service set (BSS) to determine when to invoke a TDD antenna sector switch procedure.

In one embodiment, a TDD antenna sector switch system may perform a robust antenna sector switch procedure for networks that use TDD channel access. Such protocol must be robust in order to reduce the probability that one station switches its antenna sector while the other does not receive the switch notification and hence does not perform the switch. In such a case, the link will be disconnected resulting in the loss of data and airtime. The suggested procedure supports the case when a communication link of the two communicating devices are utilizing their directive beams (e.g., quasi-omni is not assumed, and no link could be established if one of the nodes is not pointed to the peer beam direction). The TDD antenna sector switch system may allow the initiator node to manage the network (NW) link access though the core network that is used in these types of networks.

In one or more embodiments, after the TDD beamforming, the AP collects from the one or more STAs the one or more sectors that they can communicate on. Eventually, all of the one or more STAs end up with the sectors that they will use after the beamforming stage. These sectors become the sectors used for communication with the AP. There may be cases, where the AP knows that some stations have interfered with another station. The AP may wish to change the sectors to communicate on. The AP would need to notify and initiate a sector switch process with these STAs to change to different antenna sectors.

In one or more embodiments, because the AP has the information associated with the sectors of the one or more STAs, the AP can decide which sectors would need to be switched. In that case, the upper layers at the AP would send one or more messages to the MAC layer indicating a decision to perform a sector switch to at least one of the sectors associated with the one or more STAs. The MAC layer would then need to communicate with a peer MAC layer (e.g., at one STA). The AP would prepare a frame (e.g., an announce frame), and the frame would contain an indication of a sector switch request (e.g., a TDD sector switch request). The switch will need to be coordinated and synchronized between the AP and the STA. Therefore, the AP would send the time when the switch has to happen and which new sector(s) to use. If for some reason that did not work, the devices (e.g., the AP and the STA) would revert back to the sectors before the switch request.

Receiving an acknowledgment (ACK) does not necessarily translate into the upper layer (e.g., station management entity (SME)). Even though there is an ACK, the indication to the upper layer is only by the reception of the frame and not by receiving the ACK. The indication to the upper layer is transmitted regardless of sending/receiving the ACK frame.

Once the two devices are switched to the new sector, if an expected frame is not received, the device may determine that the switching process did not succeed and would then try to switch back to the previous established sector.

The proposed sector switch procedure may include multiple message exchanges between the requester and the responder. Some of these message exchanges may be performed on the existing link that utilizes the current sector configuration, and it delivers the new sector to be utilized and the future timestamp in which the switch will occur. Some may be conducted after the new sector is utilized. If these message exchanges succeeded, the new sector configuration may remain for subsequent transmission. Otherwise, the stations may revert to the old sector configuration at an agreed time.

In one embodiment, if the link is not re-established, the stations may perform TDD beamforming. With the TDD antenna sector switch system, nodes from different vendors, which are communicating over an mmWave TDD link access network via TDD-SP service periods (or slots), can negotiate and agree to switching to a new sector configuration to improve their link performance and overall network performance in general. This approach will enable usages such as fixed wireless access (FWA).

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for a TDD antenna sector switch system, in accordance with one or more example embodiments of the present disclosure.

Wireless network 100 may include one or more user device(s) 120 and one or more access point(s) (APs) 102, which may communicate in accordance with IEEE 802.11 communication standards, such as IEEE 802.11ay, IEEE 802.11ad, millimeter-wave, and WiGig specifications. The user device(s) 120 may be referred to as stations (STAs). The user device(s) 120 may be mobile devices that are non-stationary and do not have fixed locations. Although the AP 102 is shown to be communicating on multiple antennas with the user devices 120, it should be understood that this is only for illustrative purposes and that any user device 120 may also communicate using multiple antennas with the other user devices 120 and/or the AP 102.

Figure 5:
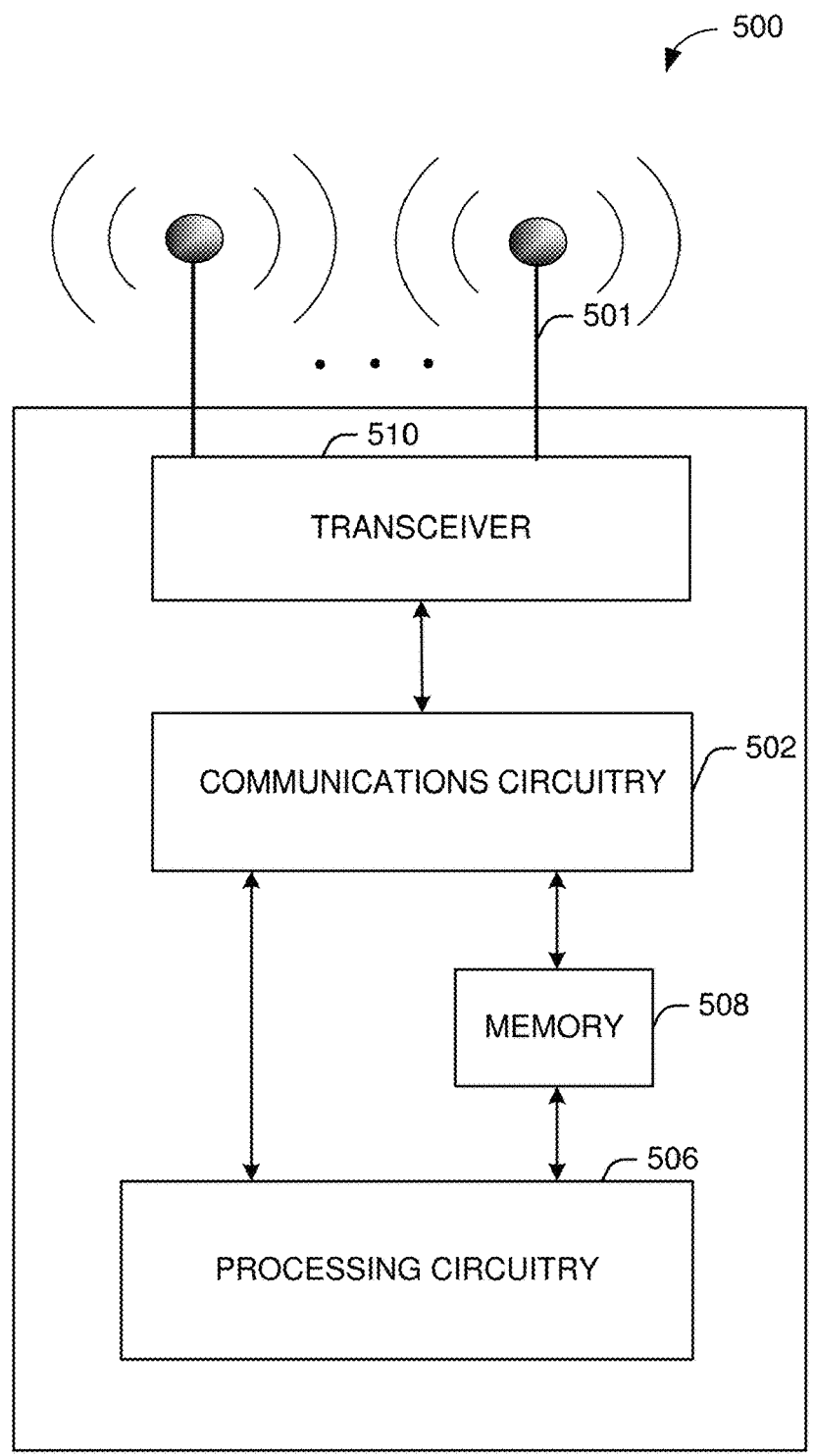
FIG. 5 illustrates a functional diagram of an example communication station that may be suitable for use as a user device, in accordance with one or more example embodiments of the present disclosure.
Figure 6:
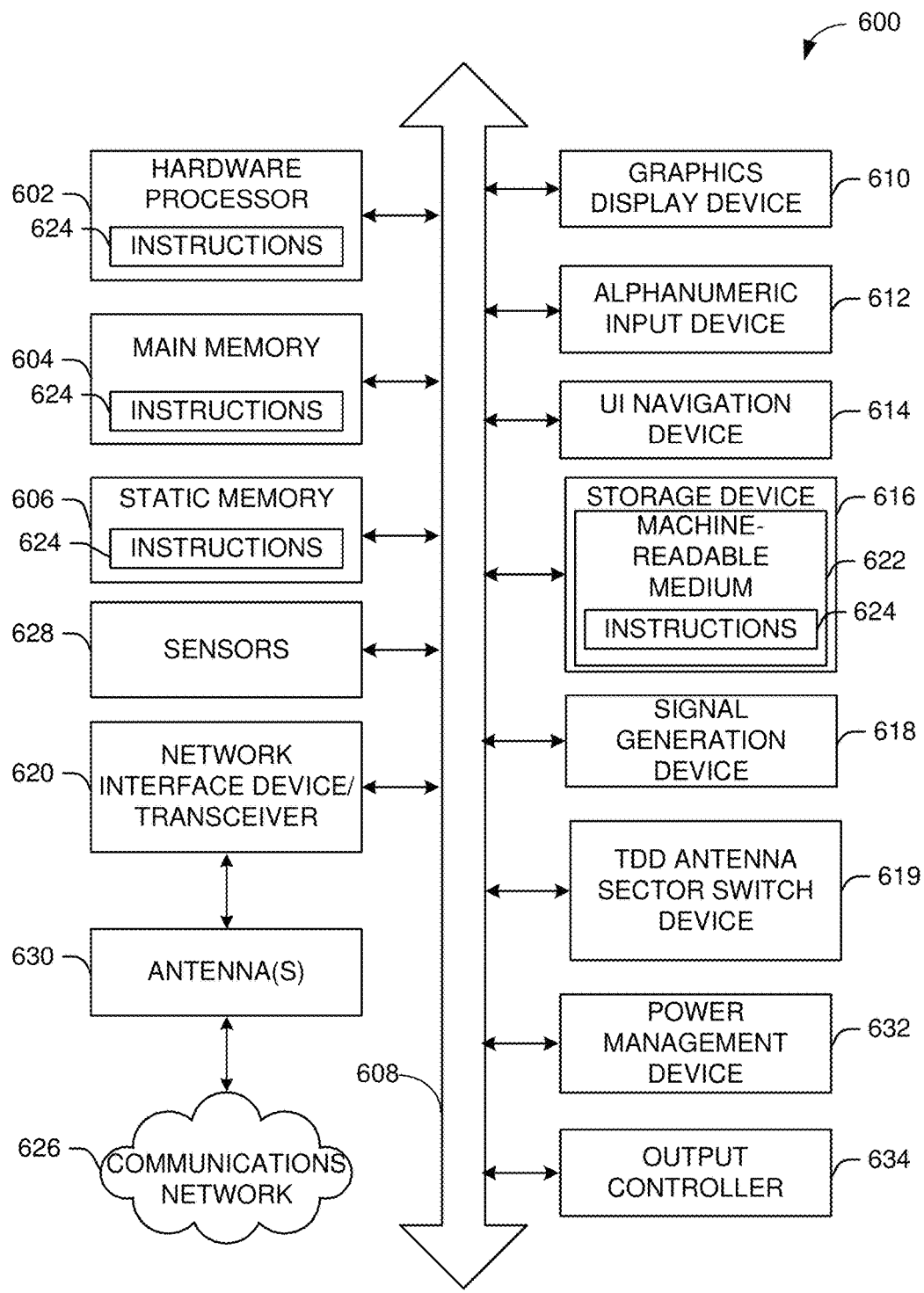
FIG. 6 illustrates a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 5 and/or the example machine/system of FIG. 6.

One or more illustrative user device(s) 120 and/or the AP 102 may be operable by one or more user(s) 110. The user device(s) 120 (e.g., 124, 126, or 128) and/or the AP 102 may include any suitable processor-driven device including, but not limited to, a mobile device or a non-mobile, e.g., a static, device. For example, the user device(s) 120 and/or the AP 102 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc., may also be included in this list.

Any of the user device(s) 120 (e.g., user devices 124, 126, 128) and the AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and the AP 102 may include one or more communications antennas. The one or more communications antennas may be any suitable type of antennas corresponding to the communications protocols used by the user device(s) 120 (e.g., user devices 124, 126 and 128) and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or the AP 102.

Any of the user devices 120 (e.g., user devices 124, 126, 128) and the AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128) and the AP 102 may be configured to perform directional transmission and/or directional reception in conjunction with wirelessly communicating in a wireless network. Any of the user device(s) 120 (e.g., user devices 124, 126, 128) and the AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128) and the AP 102 may be configured to perform any given directional transmission towards one or more defined transmit sectors. Any of the user device(s) 120 (e.g., user devices 124, 126, 128) and the AP 102 may be configured to perform any given directional reception from one or more defined receive sectors.

MIMO beamforming in a wireless network may be accomplished using RF beamforming and/or digital beamforming. In some embodiments, in performing a given MIMO transmission, the user devices 120 and/or the AP 102 may be configured to use all or a subset of its one or more communications antennas to perform MIMO beamforming.

Any of the user devices 120 (e.g., user devices 124, 126, 128) and the AP 102 may include any suitable radio and/or transceiver for transmitting and/or receiving radio frequency (RF) signals in the bandwidth and/or channels corresponding to the communications protocols utilized by any of the user device(s) 120 and the AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad, 802.11ay). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)," as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

It is understood that a basic service set (BSS) provides the basic building block of an 802.11 wireless LAN. For example, in infrastructure mode, a single access point (AP) together with all associated stations (STAs) is called a BSS.

In some demonstrative embodiments, the user devices and/or the AP 102 may be configured to support one or more mechanisms and/or features, for example, channel bonding, single user (SU) MIMO, and/or multi-user (MU) MIMO, for example, in accordance with an EDMG standard, an IEEE 802.11ay standard and/or any other standard and/or protocol.

In one embodiment, and with reference to FIG. 1, an initiator (e.g., AP 102) may be configured to communicate with one or more responders (e.g., non-AP STAs, such as the user devices 120).

For example, in order for the AP 102 to establish communication with two devices (e.g., user device 124 and user device 128), the AP 102 may need to perform beamforming training with the user device 124 and the user device 128 using beams 104 and 106. The AP 102 may transmit one or more sector sweep (SSW) frames over different antenna sectors defined by the one providing high signal quality between the AP 102 and the user device 124 and the user device 128. It is understood that the above descriptions are for purposes of illustration and are not meant to be limiting.

Figure 2:
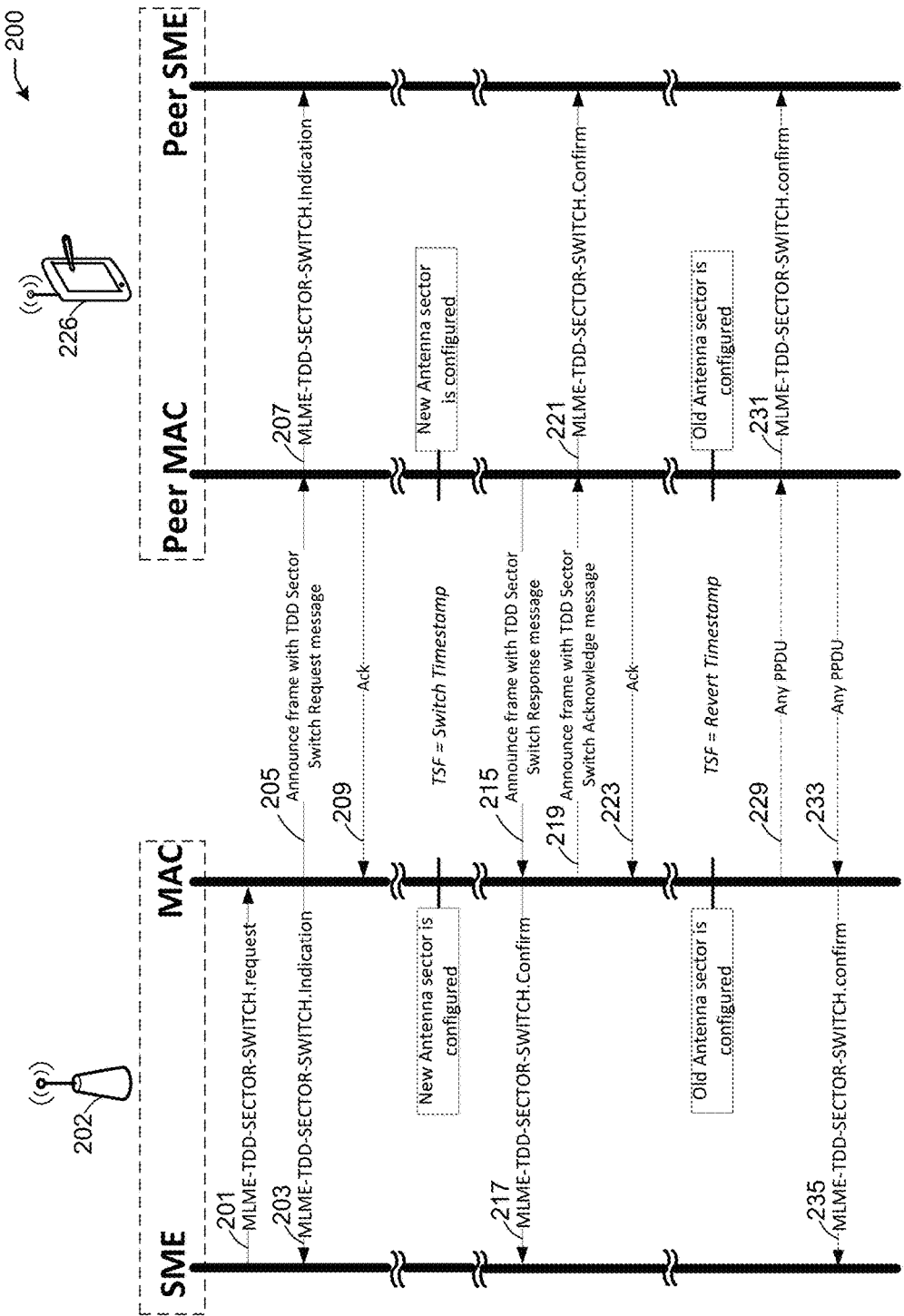
FIG. 2 depicts an illustrative schematic diagram for a TDD antenna sector switch system, in accordance with one or more example embodiments of the present disclosure.

FIG. 2 depicts an illustrative schematic diagram 200 for an mmWave distributed network antenna sector switch, in accordance with one or more example embodiments of the present disclosure.

Referring to FIG. 2, there is shown a TDD antenna sector switch procedure which exchanges messages between an initiator (e.g., AP 202) and a responder (e.g., user device 226). Some of these messages are exchanged on the existing link that utilizes the current sector configuration. The exchange of messages also delivers the new antenna sector to be utilized and the future timestamps in which the switch will occur.

As shown in FIG. 2, the AP 202 may comprise an upper layer (e.g., station management entity (SME)) to the medium access control (MAC) layer. Similarly, the user device 226, which may be a peer device to the AP 202, may comprise an upper layer (e.g., peer SME) and a peer MAC layer.

In one embodiment, a sector switch request may be sent in the current antenna sectors. A device (e.g., the AP 202 or the user device 226) may be triggered to perform a sector switch procedure from its upper layers (e.g., SME or peer SME). For example, the SME of the AP 202 may send a MLME-TDD-SECTOR-SWITCH.request 201 primitive to the MAC layer of the AP 202 to perform a sector switch procedure.

Upon such request, the device may send its peer a message with information associated with the sector switch. An example of the message that may contain that information may be an action frame, such as an announce frame (e.g., announce frame with TDD sector switch request message 205).

The information included in the action frame may include one or more of the following:

The Responder TX Sector ID, Responder RX Sector ID, Initiator TX Sector ID and Initiator RX Sector ID subfields in the TDD Sector Setting subelement may be set to, respectively, the ResponderTXSectorID, ResponderRXSectorID, InitiatorTXSectorID and InitiatorRXSectorID parameters of the request primitive. The Set Sector Request subfield in the TDD Sector Setting subelement may be set to 1.

Switch Timestamp that indicates the future time in which the stations will switch to the new sectors. This time should enable several retransmissions of the Action Announce frame and corresponding Ack frame in response in case the first transmission attempt was not successful.

Revert Timestamp subfield in the TDD Sector Setting subelement may be set to the value of the SectorRevertTimestamp parameter of the request primitive. The Revert Timestamp subfield value may be set to a time value that allows the responder at least three retransmissions of a TDD sector response message, for the case where the responder does not receive the TDD sector acknowledge message from the initiator, plus time to allow the initiator at least three retransmissions of a TDD sector acknowledge message, for the case where the initiator does not receive the Ack frame from the responder.

In one embodiment, a new sector switch request (e.g., a TDD antenna sector switch request) incorporating a new Switch Timestamp value may not be issued until the Revert Timestamp of the previous request primitive has been elapsed.

In one embodiment, the Set Sector Request in the TDD Sector Setting subelement may be set to 1 to indicate the message is of the type sector switch request.

In one embodiment, the user device 226 receiving the TDD antenna sector switch request (e.g., the announce frame with TDD sector switch request message 205) should send an acknowledgment frame 209 at the earliest TDD slot it was assigned to.

An initiator STA (e.g., AP 202) that does not receive an Ack frame 209 in response to a TDD sector switch request message 205 may retransmit the TDD sector switch request message 205 until the time indicated by the Switch Timestamp subfield.

A MLME-TDD-SECTOR-SWITCH.request 201 primitive incorporating a new SectorSwitchTimestamp value may not be issued until the SectorRevertTimestamp of the previous request primitive has elapsed.

In one embodiment, a responder behavior (e.g., user device 226) after it acknowledges the sector switch request message (e.g., sending Ack frame 209) may be as follows:

Inform its upper layer on the reception of the sector switch request. For example, sending an indication (e.g., MLME-TDD-SECTOR-SWITCH.Indication 207). The indication may include the peer MAC address of the received message, and the Responder TX Sector ID, Responder RX Sector ID, Initiator TX Sector ID and Initiator RX Sector ID within the received message. For example, the peer MAC layer of the user device 226 may issue an MLME-TDD-SECTOR-SWITCH.Indication 207 primitive with the PeerSTAAddress parameter set to the transmitting station address (TA) of the received message, and the ResponderTXSectorID, ResponderRXSectorID, InitiatorTXSectorID and InitiatorRXSectorID parameters of the primitive set to, respectively, the Responder TX Sector ID, Responder RX Sector ID, Initiator TX Sector ID and Initiator RX Sector ID subfields of the TDD Sector Setting subelement within the received message.

Respond with an acknowledgment (Ack) frame 209 to any TDD sector switch request messages that arrive before the time indicated by the Switch Timestamp subfield value within the message.

Set its receive and transmit antenna sector to the Responder RX Sector ID and Responder TX Sector ID subfield received from the TDD antenna sector switch request message, respectively, at the time indicated by the Switch Timestamp subfield.

Send to the initiator (e.g., AP 202) a TDD sector switch response message by transmitting an Announce frame of subtype Action No Ack with the same Sector Setting subelement that was received by the responder, except that the Set Sector Request subfield may be set to 0 and the Set Sector Response subfield may be set to 1 (e.g., sending an announce frame with TDD sector switch response message 215). The TDD sector switch message should be sent at the earliest TDD slot occurring after the time indicated by the value of the Switch Timestamp subfield.

In one embodiment, an initiator's (e.g., AP 202) behavior after it receives the Ack frame 209 on the TDD antenna sector switch request it sent may be as follows:

Inform its upper layer that the request has been sent successfully by issuing an indication that the Responder TX Sector ID, Responder RX Sector ID, Initiator TX Sector ID and Initiator RX Sector ID subfields in the TDD Sector Setting subelement were received. For example, the initiator may issue an MLME-TDD-SECTOR-SWITCH.Indication 203 primitive with the ResponderTXSectorID, ResponderRXSectorID, InitiatorTXSectorID and InitiatorRXSectorID parameters of the primitive set to the Responder TX Sector ID, Responder RX Sector ID, Initiator TX Sector ID and Initiator RX Sector ID subfields in the TDD Sector Setting subelement that was sent in the respective TDD sector switch request message (e.g., announce frame with TDD sector switch request message 205).

Set its receive and transmit antenna sectors to the Initiator TX Sector ID and Initiator RX Sector ID values respectively starting from the time indicated by the Switch Timestamp subfield at the time indicated by the value of the Switch Timestamp subfield.

In one or more embodiments, after the transmission of the sector switch request and its corresponding Ack in the old sectors, the two stations now switch to the new sectors at the time indicated by the Switch Timestamp. After the sector switch, the responder sends the initiator the sector switch response (e.g., announce frame with TDD sector switch response message 215) in the new sector configuration.

In one or more embodiments, a station (e.g., AP 202) that receives the sector switch response frame may send its peer (e.g., user device 226) a sector switch acknowledge frame (e.g., announce frame with TDD sector switch acknowledge message 219) by transmitting a frame with the same Sector Setting subelement that was received by the STA, except that the Set Sector Response subfield maybe set to 0 and the Set Sector Acknowledge subfield may be set to 1, sent at the earliest TDD slots occurring after the Switch Timestamp value. That is, an initiator (e.g., AP 202) receiving a TDD sector switch response message 215 may send the responder a TDD sector switch acknowledge message 219 by transmitting an announce frame of subtype Action with the same Sector Setting subelement that was received by the AP 202, except that the Set Sector Response subfield may be set to 0 and the Set Sector Acknowledge subfield may be set to 1. The TDD sector switch acknowledge message 219 should be sent at the earliest TDD slot occurring after the time indicated by the value of the Switch Timestamp subfield.

In one or more embodiments, a DMG STA (e.g., user device 226) that has not received a sector switch acknowledge frame in response to the TDD antenna sector switch response it sent, may retransmit the response frame until the time indicated by the Revert Timestamp value. Also, an initiator (e.g., AP 202) that did not receive an Ack frame 223 in response to a transmitted TDD sector switch acknowledge message 219 may retransmit the TDD sector switch acknowledge message before the time indicated by the Revert Timestamp subfield value.

In one or more embodiments, the sector switch procedure is considered as "succeeded" in the case where the stations are receiving a TDD antenna sector switch acknowledgment or an Ack in response to a TDD antenna sector switch acknowledgment before the Revert Timestamp time has elapsed. In this case, the station confirms the procedure's success by indicating it to its upper layer.

In one or more embodiments, an initiator (e.g., AP 202) that did not receive an Ack frame in response to a transmitted TDD sector switch acknowledge message should retransmit the TDD sector switch acknowledge message before the time indicated by the Revert Timestamp subfield value.

In one or more embodiments, a responder (e.g., user device 226) that did not receive a TDD sector switch acknowledge message by the time indicated by the Revert Timestamp subfield value may issue an MLME-TDD-SECTOR-SWITCH.Confirm 221 primitive with the ResultCode parameter set to FAILURE and may revert to the antenna configuration used at the start of the TDD sector switch procedure.

In one or more embodiments, an initiator (e.g., AP 202) that did not receive a TDD sector switch response message 215 by the time indicated by the Revert Timestamp subfield value may issue an MLME-TDD-SECTOR-SWITCH.Confirm 217 primitive with the ResultCode parameter set to FAILURE and may revert to the antenna configuration used at the start of the TDD sector switch procedure.

In one or more embodiments, an initiator (e.g., AP 202) that reverted to the previous antenna configuration at the time indicated by the Revert Timestamp subfield value may send a PPDU 229 that requires an Ack frame at the earliest TDD slots occurring after the Revert Timestamp subfield value. An initiator (e.g., AP 202) receiving a PPDU 233 after the time indicated by the Revert Timestamp subfield may issue an MLME-TDD-SECTOR-SWITCH.confirm 235 primitive. The TXSectorID and RXSectorID parameters of the primitive may be set to the sectors used at the start of the TDD sector switch procedure and the ResultCode parameter may be set to SUCCESS.

In one or more embodiments, a responder receiving a PPDU 229 after the time indicated by the Revert Timestamp subfield value may issue an MLME-TDD-SECTOR-SWITCH.confirm 231 primitive. The TXSectorID and RXSectorID parameters of the primitive may be set to the sectors used at the start of the TDD sector switch procedure and the ResultCode parameter may be set to SUCCESS.

In one or more embodiments, a TDD initiator (e.g., AP 202) that did not receive an Ack frame in response to a transmitted PPDU 229 may initiate the TDD beamforming procedure again.

In one or more embodiments, a responder (e.g., user device 226) that reverted to the antenna configuration at the time indicated by the Revert Timestamp subfield value and that did not receive a PPDU from the initiator at a TDD slot occurring after the Revert Timestamp subfield value may start the TDD beamforming procedure again.

In one or more embodiments, a beamforming and link establishment system may perform an efficient and robust beamforming procedure for networks that use TDD channel access. The beamforming and link establishment system may support the case when a communication link can only be established if the two communicating devices are utilizing their directive beams (e.g., quasi-omni is not assumed, and no link could be established if one of the nodes is not pointed to the peer beam direction). The proposed method allows the initiator node to manage the network (NW) link access through the core network that is used in such types of networks.

The beamforming and link establishment system may be divided into two phases: (1) asynchronous beamforming (BF), which may be an initial phase that is used to achieve a link connection when the network configuration and parameters are not known to the prospective new node (e.g., BF responder). The achieved link connection in this phase may not be optimal and is used mainly to deliver to the BF responder the network configuration so that the next phase (phase two) can start in order to achieve the optimal link configuration; and (2) synchronous BF, which may be the main phase after the nodes are connected. In this phase, nodes train their mutual antenna configurations and decide on the optimal antenna configuration used by each of the nodes. This phase may occur after the two nodes obtained the network configuration and are synchronized to the NW timestamp. This beamforming method assumes that the antenna configurations of both the initiator and the responder are reciprocal, which is a reasonable assumption for this type of use case deployed by a network operator.

In one embodiment, the beamforming and link establishment system may facilitate that nodes from different vendors and that are utilizing different antenna configurations may connect to an mmWave TDD link access network. This approach will enable usages such as FWA.

It is understood that the above descriptions are for purposes of illustration and are not meant to be limiting.

Figure 3A:
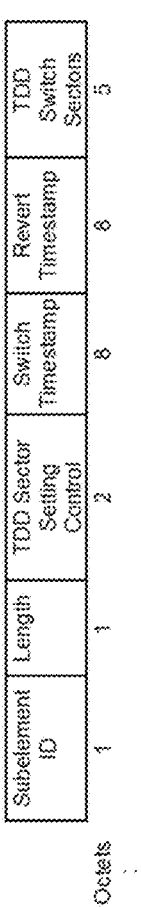
FIGS. 3A-3C depict illustrative schematic diagrams for a TDD antenna sector switch system, in accordance with one or more example embodiments of the present disclosure.
Figure 3B:
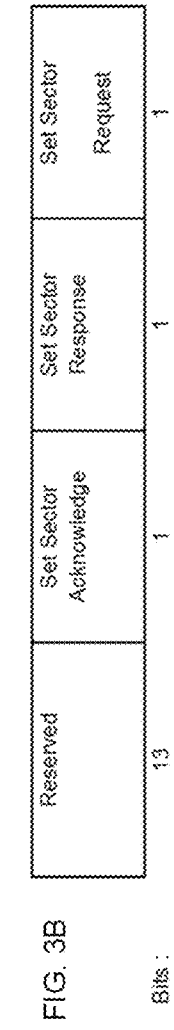
Figure 3C:
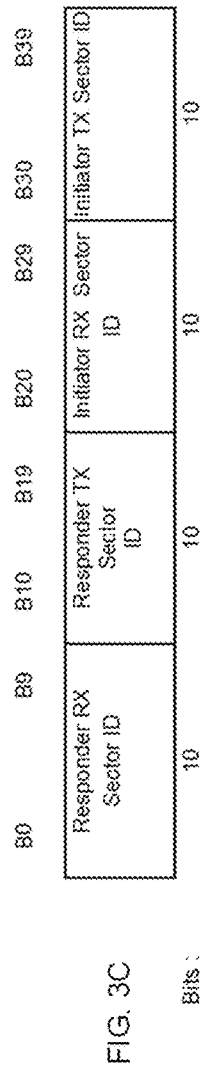

FIGS. 3A-3C depict illustrative schematic diagrams for a TDD antenna sector switch system, in accordance with one or more example embodiments of the present disclosure.

Referring to FIG. 3A, there is shown a TDD Sector Setting subelement format.

In one embodiment, the frame description and information may be included.

In one embodiment, the TDD Sector Setting subelement may be used to request the peer to configure its antenna to a specific receive and transmit sector combination.

Referring to FIG. 3B, there is shown a TDD Sector Setting Control field format.

In one embodiment, a Set Sector Request subfield may be set to 1 by the initiator to indicate the responder to change its receiver sector setting according to the Responder RX Sector ID subfield and its transmitter sector setting according to the Responder TX Sector ID. The Set Sector Response subfield may be set to 1 by the responder to indicate the reception of a successful TDD Sector Setting subelement with the Set Sector Request subfield set to 1. The Set Sector Acknowledge subfield may be set to 1 by the initiator to acknowledge the reception of a successful TDD Sector Setting subelement with the Sector Response subfield set to 1. The Switch Timestamp subfield indicates the future timing synchronization function (TSF) timer value in which the new sector configuration setting is to take effect. The Revert Timestamp subfield indicates the future TSF timer value in which the old sector configuration will be reverted to in case of failure. timing synchronization function (TSF)

Referring to FIG. 3C, there is shown a TDD Switch Sectors field format.

In one embodiment, the Responder RX Sector ID subfield contains the value of the sector index the responder uses to set its receive antenna sector. The Responder TX Sector ID subfield contains the value of the sector index the responder uses to set its transmit antenna sector. The Initiator RX Sector ID subfield contains the value of the sector index the initiator uses to set its receive antenna sector. The Initiator TX Sector ID subfield contains the value of the sector index the initiator uses to set its transmit antenna sector. It is understood that the above descriptions are for purposes of illustration and are not meant to be limiting.

Figure 4:
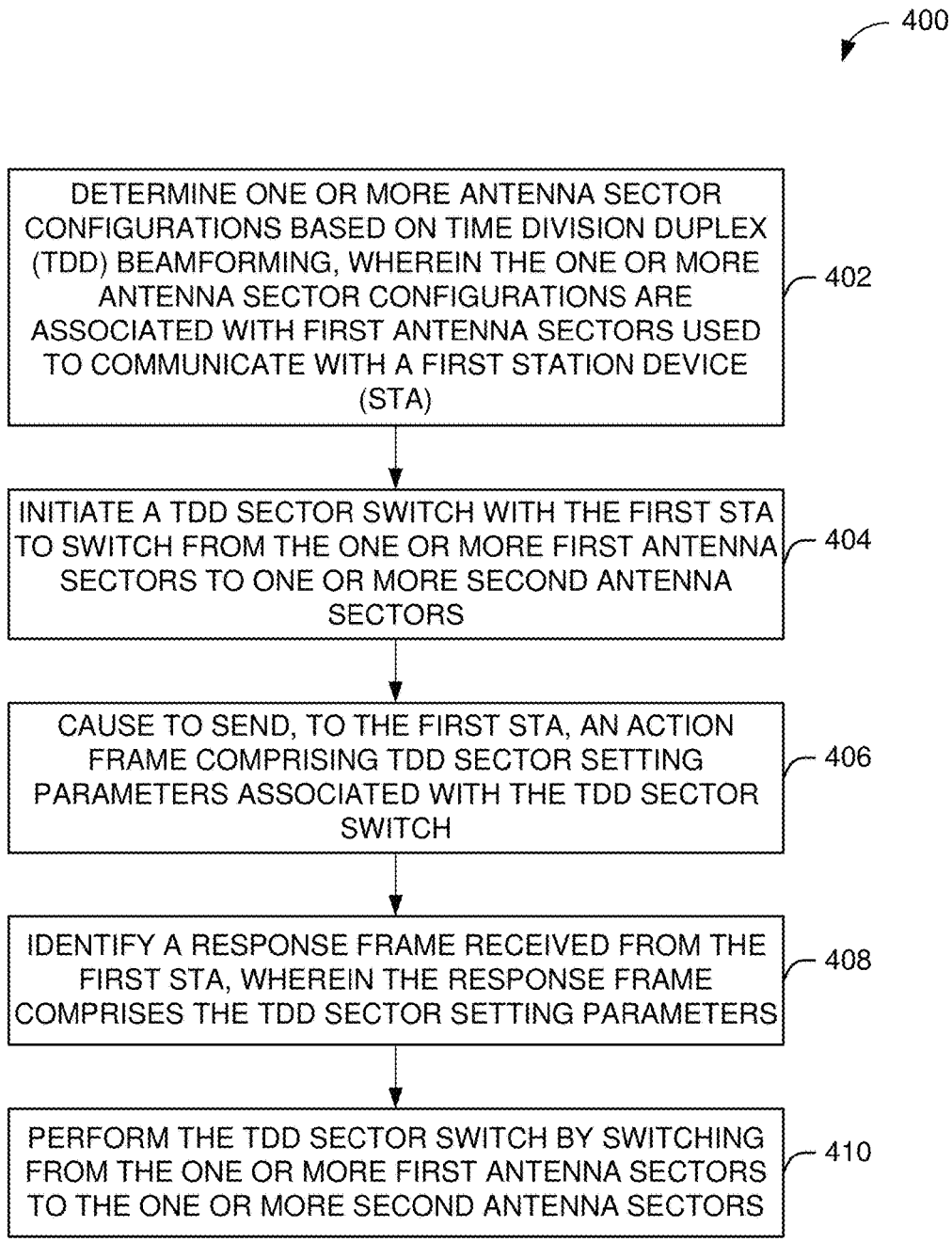
FIG. 4 illustrates a flow diagram of an illustrative process 400 for an illustrative TDD antenna sector switch system, in accordance with one or more example embodiments of the present disclosure.

FIG. 4 illustrates a flow diagram of an illustrative process 400 for an illustrative TDD antenna sector switch system, in accordance with one or more example embodiments of the present disclosure.

At block 402, a device (e.g., the user device(s) 120 and/or the AP 102 of FIG. 1) may determine one or more antenna sector configurations based on time division duplex (TDD) beamforming, wherein the one or more antenna sector configurations are associated with first antenna sectors used to communicate with a first station device (STA).

TDD beamforming comprises establishing a first initiator transmit (TX) antenna sector identification (ID), a first initiator receive (RX) antenna sector ID, a first responder TX antenna sector ID, and a first responder RX antenna sector ID.

At block 404, the device may initiate a TDD sector switch with the first STA to switch from the one or more first antenna sectors to one or more second antenna sectors. For example, the device may initiate a switch indication with the TDD sector setting parameters to an upper layer of a medium access control (MAC) of the initiator, wherein the upper layer of the MAC of the initiator is associated with an upper layer circuitry. For example, an AP may comprise an upper layer (e.g., station management entity (SME)) to the medium access control (MAC) layer. Similarly, the user device, which may be a peer device to the AP, may comprise an upper layer (e.g., peer SME) and a peer MAC layer. A sector switch request may be sent in the current antenna sectors. A device (e.g., the AP or the user device) may be triggered to perform a sector switch procedure from its upper layers (e.g., SME or peer SME). For example, the SME of the AP may send a MLME-TDD-SECTOR-SWITCH.request primitive to the MAC layer of the AP to perform a sector switch procedure.

At block 406, the device may cause to send, to the first STA, an action frame comprising TDD sector setting parameters associated with the TDD sector switch. The action frame is an announce frame indicating a TDD sector switch request. Upon the request from the upper layer, the device may send its peer a message with information associated with the sector switch. An example of the message that may contain that information may be an action frame, such as an announce frame (e.g., announce frame with TDD sector switch request message).

At block 408, the device may identify a response frame received from the first STA, wherein the response frame comprises the TDD sector setting parameters. The response frame may be an announce frame indicating a TDD sector switch response. The TDD sector setting parameters may indicate a second sector configuration to which the device and the first STA are to switch to. For example, a responder (e.g., an STA) may send to the initiator (e.g., an AP) a TDD sector switch response message by transmitting an Announce frame of subtype Action No Ack with the same Sector Setting subelement that was received by the responder, except that the Set Sector Request subfield may be set to 0 and the Set Sector Response subfield may be set to 1 (e.g., sending an announce frame with TDD sector switch response message). The TDD sector switch message should be sent at the earliest TDD slot occurring after the time indicated by the value of the Switch Timestamp subfield. The device may send an acknowledgment frame to the response frame. The acknowledgment frame may comprise a set sector acknowledgment subfield set to a first value.

At block 410, the device may perform the TDD sector switch by switching from the one or more first antenna sectors to the one or more second antenna sectors. For example, when both the responder and the initiator agree, they perform the TDD sector switch. However, if the initiator and/or the responder determine the TDD sector switch has failed, then they may determine to revert back to a TX and RX antenna configuration used at a start of the TDD sector switch.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communications circuitry 502). The communications circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" may also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a TDD antenna sector switch device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The TDD antenna sector switch device 619 may carry out or perform any of the operations and processes (e.g., processes 400 and 450) described and shown above. For example, the TDD antenna sector switch device 619 may pair DMG STAs operating in an SP with TDD channel access to synchronize the switch of transmit and receive sectors for communication between them. The DMG STA can make use of the information achieved during the TDD beamforming procedure or the results of measurements undertaken by the STAs in the basic service set (BSS) to determine when to invoke a TDD antenna sector switch procedure.

The TDD antenna sector switch device 619 may perform a robust antenna sector switch procedure for networks that use TDD channel access. Such protocol must be robust in order to reduce the probability that one station switches its antenna sector while the other does not receive the switch notification and hence does not perform the switch. In such a case, the link will be disconnected resulting in the loss of data and airtime. The suggested procedure supports the case when a communication link of the two communicating devices are utilizing their directive beams (e.g., quasi-omni is not assumed, and no link could be established if one of the nodes is not pointed to the peer beam direction). The TDD antenna sector switch system may allow the initiator node to manage the network (NW) link access though the core network that is used in these types of networks.

The TDD antenna sector switch device 619 may facilitate that after the TDD beamforming, the AP collects from the one or more STAs the one or more sectors that they can communicate on. Eventually, all of the one or more STAs end up with the sectors that they will use after the beamforming stage. These sectors become the sectors used for communication with the AP. There may be cases, where the AP knows that some stations have interfered with another station. The AP may wish to change the sectors to communicate on. The AP would need to notify and initiate a sector switch process with these STAs to change to different antenna sectors.

The TDD antenna sector switch device 619 may facilitate that because the AP has the information associated with the sectors of the one or more STAs, the AP can decide which sectors would need to be switched. In that case, the upper layers at the AP would send one or more messages to the MAC layer indicating a decision to perform a sector switch to at least one of the sectors associated with the one or more STAs. The MAC layer would then need to communicate with a peer MAC layer (e.g., at one STA). The AP would prepare a frame (e.g., an announce frame), and the frame would contain an indication of a sector switch request (e.g., a TDD sector switch request). The switch will need to be coordinated and synchronized between the AP and the STA. Therefore, the AP would send the time when the switch has to happen and which new sector(s) to use. If for some reason that did not work, the devices (e.g., the AP and the STA) would revert back to the sectors before the switch request. Receiving an acknowledgment (ACK) does not necessarily translate into the upper layer (e.g., station management entity (SME)). Even though there is an ACK, the indication to the upper layer is only by the reception of the frame and not by receiving the ACK. The indication to the upper layer is transmitted regardless of sending/receiving the ACK frame. Once the two devices are switched to the new sector, if an expected frame is not received, the device may determine that the switching process did not succeed and would then try to switch back to the previous established sector. The proposed sector switch procedure may include multiple message exchanges between the requester and the responder. Some of these message exchanges may be performed on the existing link that utilizes the current sector configuration, and it delivers the new sector to be utilized and the future timestamp in which the switch will occur. Some may be conducted after the new sector is utilized. If these message exchanges succeeded, the new sector configuration may remain for subsequent transmission. Otherwise, the stations may revert to the old sector configuration at an agreed time.

The TDD antenna sector switch device 619 may facilitate that if the link is not re-established, the stations may perform TDD beamforming. With the TDD antenna sector switch system, nodes from different vendors, which are communicating over an mmWave TDD link access network via TDD-SP service periods (or slots), can negotiate and agree to switching to a new sector configuration to improve their link performance and overall network performance in general. This approach will enable usages such as fixed wireless access (FWA).

It is understood that the above are only a subset of what the TDD antenna sector switch device 619 may be configured to perform and that other functions included throughout this disclosure may also be performed by the TDD antenna sector switch device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" may be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple-input multiple-output (MIMO) transceiver or device, a single-input multiple-output (SIMO) transceiver or device, a multiple-input single-output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine one or more antenna sector configurations based on time division duplex (TDD) beamforming, wherein the one or more antenna sector configurations are associated with first antenna sectors used to communicate with a first station device (STA); initiate a TDD sector switch with the first STA to switch from the one or more first antenna sectors to one or more second antenna sectors; cause to send, to the first STA, an action frame comprising TDD sector setting parameters associated with the TDD sector switch; identify a response frame received from the first STA, wherein the response frame comprises the TDD sector setting parameters; and perform the TDD sector switch by switching from the one or more first antenna sectors to the one or more second antenna sectors.

Example 2 may include the device of example 1 and/or some other example herein, wherein TDD beamforming comprises establishing a first initiator transmit (TX) antenna sector identification (ID), a first initiator receive (RX) antenna sector ID, a first responder TX antenna sector ID, and a first responder RX antenna sector ID.

Example 3 may include the device of example 1 and/or some other example herein, wherein the action frame may be an announce frame indicating a TDD sector switch request.

Example 4 may include the device of example 1 and/or some other example herein, wherein the response frame may be an announce frame indicating a TDD sector switch response.

Example 5 may include the device of example 1 and/or some other example herein, wherein the TDD sector setting parameters indicates a second sector configuration to which the device and the first STA are to switch to.

Example 6 may include the device of example 1 and/or some other example herein, wherein the processing circuitry may be further configured to: initiate a switch indication with the TDD sector setting parameters to an upper layer of a medium access control (MAC) of the initiator, wherein the upper layer of the MAC of the initiator may be associated with an upper layer circuitry; and set a transmit (TX) and a receive (RX) antenna configuration based on the TDD sector setting parameters sent to the first STA.

Example 7 may include the device of example 1 and/or some other example herein, wherein the processing circuitry may be further configured to cause to send an acknowledgment frame to the response frame, wherein the acknowledgment frame comprises a set sector acknowledgment subfield set to a first value.

Example 8 may include the device of example 1 and/or some other example herein, wherein the processing circuitry may be further configured to: determine the TDD sector switch has failed; and determine to revert back to a TX and RX antenna configuration used at a start of the TDD sector switch.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver.

Example 11 may include a non-transitory computer-readable medium storing computer-executable instructions which when executed by one or more processors result in performing operations comprising: determining one or more antenna sector configurations based on time division duplex (TDD) beamforming, wherein the one or more antenna sector configurations are associated with first antenna sectors used to communicate with a first station device (STA); initiating a TDD sector switch with the first STA to switch from the one or more first antenna sectors to one or more second antenna sectors; causing to send, to the first STA, an action frame comprising TDD sector setting parameters associated with the TDD sector switch; identifying a response frame received from the first STA, wherein the response frame comprises the TDD sector setting parameters; and performing the TDD sector switch by switching from the one or more first antenna sectors to the one or more second antenna sectors.

Example 12 may include the non-transitory computer-readable medium of example 11 and/or some other example herein, wherein TDD beamforming comprises establishing a first initiator transmit (TX) antenna sector identification (ID), a first initiator receive (RX) antenna sector ID, a first responder TX antenna sector ID, and a first responder RX antenna sector ID.

Example 13 may include the non-transitory computer-readable medium of example 11 and/or some other example herein, wherein the action frame may be an announce frame indicating a TDD sector switch request.

Example 14 may include the non-transitory computer-readable medium of example 11 and/or some other example herein, wherein the response frame may be an announce frame indicating a TDD sector switch response.

Example 15 may include the non-transitory computer-readable medium of example 11 and/or some other example herein, wherein the TDD sector setting parameters indicates a second sector configuration to which the device and the first STA are to switch to.

Example 16 may include the non-transitory computer-readable medium of example 11 and/or some other example herein, wherein the operations further comprise: initiating a switch indication with the TDD sector setting parameters to an upper layer of a medium access control (MAC) of the initiator, wherein the upper layer of the MAC of the initiator may be associated with an upper layer circuitry; and setting a transmit (TX) and a receive (RX) antenna configuration based on the TDD sector setting parameters sent to the first STA.

Example 17 may include the non-transitory computer-readable medium of example 11 and/or some other example herein, wherein the operations further comprise causing to send an acknowledgment frame to the response frame, wherein the acknowledgment frame comprises a set sector acknowledgment subfield set to a first value.

Example 18 may include the non-transitory computer-readable medium of example 11 and/or some other example herein, wherein the operations further comprise: determining the TDD sector switch has failed; and determining to revert back to a TX and RX antenna configuration used at a start of the TDD sector switch.

Example 19 may include a method comprising: determining, by one or more processors, one or more antenna sector configurations based on time division duplex (TDD) beamforming, wherein the one or more antenna sector configurations are associated with first antenna sectors used to communicate with a first station device (STA); initiating a TDD sector switch with the first STA to switch from the one or more first antenna sectors to one or more second antenna sectors; causing to send, to the first STA, an action frame comprising TDD sector setting parameters associated with the TDD sector switch; identifying a response frame received from the first STA, wherein the response frame comprises the TDD sector setting parameters; and performing the TDD sector switch by switching from the one or more first antenna sectors to the one or more second antenna sectors.

Example 20 may include the method of example 19 and/or some other example herein, wherein TDD beamforming comprises establishing a first initiator transmit (TX) antenna sector identification (ID), a first initiator receive (RX) antenna sector ID, a first responder TX antenna sector ID, and a first responder RX antenna sector ID.

Example 21 may include the method of example 19 and/or some other example herein, wherein the action frame may be an announce frame indicating a TDD sector switch request.

Example 22 may include the method of example 19 and/or some other example herein, wherein the response frame may be an announce frame indicating a TDD sector switch response.

Example 23 may include the method of example 19 and/or some other example herein, wherein the TDD sector setting parameters indicates a second sector configuration to which the device and the first STA are to switch to.

Example 24 may include the method of example 19 and/or some other example herein, further comprising: initiating a switch indication with the TDD sector setting parameters to an upper layer of a medium access control (MAC) of the initiator, wherein the upper layer of the MAC of the initiator may be associated with an upper layer circuitry; and setting a transmit (TX) and a receive (RX) antenna configuration based on the TDD sector setting parameters sent to the first STA.

Example 25 may include the method of example 19 and/or some other example herein, further comprising causing to send an acknowledgment frame to the response frame, wherein the acknowledgment frame comprises a set sector acknowledgment subfield set to a first value.

Example 26 may include the method of example 19 and/or some other example herein, further comprising: determining the TDD sector switch has failed; and determining to revert back to a TX and RX antenna configuration used at a start of the TDD sector switch.

Example 27 may include an apparatus comprising means for: determining one or more antenna sector configurations based on time division duplex (TDD) beamforming, wherein the one or more antenna sector configurations are associated with first antenna sectors used to communicate with a first station device (STA); initiating a TDD sector switch with the first STA to switch from the one or more first antenna sectors to one or more second antenna sectors; causing to send, to the first STA, an action frame comprising TDD sector setting parameters associated with the TDD sector switch; identifying a response frame received from the first STA, wherein the response frame comprises the TDD sector setting parameters; and performing the TDD sector switch by switching from the one or more first antenna sectors to the one or more second antenna sectors.

Example 28 may include the apparatus of example 27 and/or some other example herein, wherein TDD beamforming comprises establishing a first initiator transmit (TX) antenna sector identification (ID), a first initiator receive (RX) antenna sector ID, a first responder TX antenna sector ID, and a first responder RX antenna sector ID.

Example 29 may include the apparatus of example 27 and/or some other example herein, wherein the action frame may be an announce frame indicating a TDD sector switch request.

Example 30 may include the apparatus of example 27 and/or some other example herein, wherein the response frame may be an announce frame indicating a TDD sector switch response.

Example 31 may include the apparatus of example 27 and/or some other example herein, wherein the TDD sector setting parameters indicates a second sector configuration to which the device and the first STA are to switch to.

Example 32 may include the apparatus of example 27 and/or some other example herein, further comprising: initiating a switch indication with the TDD sector setting parameters to an upper layer of a medium access control (MAC) of the initiator, wherein the upper layer of the MAC of the initiator may be associated with an upper layer circuitry; and setting a transmit (TX) and a receive (RX) antenna configuration based on the TDD sector setting parameters sent to the first STA.

Example 33 may include the apparatus of example 27 and/or some other example herein, further comprising causing to send an acknowledgment frame to the response frame, wherein the acknowledgment frame comprises a set sector acknowledgment subfield set to a first value.

Example 34 may include the apparatus of example 27 and/or some other example herein, further comprising: determining the TDD sector switch has failed; and determining to revert back to a TX and RX antenna configuration used at a start of the TDD sector switch.

Example 35 may include one or more non-transitory computer-readable media comprising instructions to cause an electronic device, upon execution of the instructions by one or more processors of the electronic device, to perform one or more elements of a method described in or related to any of examples 1-34, or any other method or process described herein Example 36 may include an apparatus comprising logic, modules, and/or circuitry to perform one or more elements of a method described in or related to any of examples 1-34, or any other method or process described herein.

Example 37 may include a method, technique, or process as described in or related to any of examples 1-34, or portions or parts thereof.

Example 38 may include an apparatus comprising: one or more processors and one or more computer readable media comprising instructions that, when executed by the one or more processors, cause the one or more processors to perform the method, techniques, or process as described in or related to any of examples 1-34, or portions thereof.

Example 39 may include a method of communicating in a wireless network as shown and described herein.

Example 40 may include a system for providing wireless communication as shown and described herein.

Example 41 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device of an initiator for performing time division duplex (TDD) sector switch, the device comprising memory and processing circuitry, the processing circuitry coupled to the memory, and the processing circuitry configured to:
   determine one or more antenna sector configurations based on time division duplex (TDD) beamforming, wherein the one or more antenna sector configurations are associated with first antenna sectors used to communicate with a first station device (STA);
   initiate a TDD sector switch with the first STA to switch from the one or more first antenna sectors to one or more second antenna sectors;
   cause to send, to the first STA, an action frame comprising TDD sector setting parameters associated with the TDD sector switch;
   identify a response frame received from the first STA, wherein the response frame comprises the TDD sector setting parameters; and
   perform the TDD sector switch by switching from the one or more first antenna sectors to the one or more second antenna sectors.

2. The device of claim 1, wherein TDD beamforming comprises establishing a first initiator transmit (TX) antenna sector identification (ID), a first initiator receive (RX) antenna sector ID, a first responder TX antenna sector ID, and a first responder RX antenna sector ID.

3. The device of claim 1, wherein the action frame is an announce frame indicating a TDD sector switch request.

4. The device of claim 1, wherein the response frame is an announce frame indicating a TDD sector switch response.

5. The device of claim 1, wherein the TDD sector setting parameters indicates a second sector configuration to which the device and the first STA are to switch to.

6. The device of claim 1, wherein the processing circuitry is further configured to:
   initiate a switch indication with the TDD sector setting parameters to an upper layer of a medium access control (MAC) of the initiator, wherein the upper layer of the MAC of the initiator is associated with an upper layer circuitry; and
   set a transmit (TX) and a receive (RX) antenna configuration based on the TDD sector setting parameters sent to the first STA.

7. The device of claim 1, wherein the processing circuitry is further configured to cause to send an acknowledgment frame to the response frame, wherein the acknowledgment frame comprises a set sector acknowledgment subfield set to a first value.

8. The device of claim 1, wherein the processing circuitry is further configured to:
   determine the TDD sector switch has failed; and
   determine to revert back to a TX and RX antenna configuration used at a start of the TDD sector switch.

9. The device of claim 1, further comprising a transceiver configured to transmit and receive wireless signals.

10. The device of claim 9, further comprising an antenna coupled to the transceiver and further comprising the one or more first antenna sectors and the one or more second antenna sectors.

11. A non-transitory computer-readable medium storing computer-executable instructions which when executed by one or more processors result in performing operations comprising:
   determining one or more antenna sector configurations based on time division duplex (TDD) beamforming, wherein the one or more antenna sector configurations are associated with first antenna sectors used to communicate with a first station device (STA);

initiating a TDD sector switch with the first STA to switch from the one or more first antenna sectors to one or more second antenna sectors;

causing to send, to the first STA, an action frame comprising TDD sector setting parameters associated with the TDD sector switch;

identifying a response frame received from the first STA, wherein the response frame comprises the TDD sector setting parameters; and performing the TDD sector switch by switching from the one or more first antenna sectors to the one or more second antenna sectors.

12. The non-transitory computer-readable medium of claim 11, wherein TDD beamforming comprises establishing a first initiator transmit (TX) antenna sector identification (ID), a first initiator receive (RX) antenna sector ID, a first responder TX antenna sector ID, and a first responder RX antenna sector ID.

13. The non-transitory computer-readable medium of claim 11, wherein the action frame is an announce frame indicating a TDD sector switch request.

14. The non-transitory computer-readable medium of claim 11, wherein the response frame is an announce frame indicating a TDD sector switch response.

15. The non-transitory computer-readable medium of claim 11, wherein the TDD sector setting parameters indicates a second sector configuration to which the device and the first STA are to switch to.

16. The non-transitory computer-readable medium of claim 11, wherein the operations further comprise:

initiating a switch indication with the TDD sector setting parameters to an upper layer of a medium access control (MAC) of the initiator, wherein the upper layer of the MAC of the initiator is associated with an upper layer circuitry; and setting a transmit (TX) and a receive (RX) antenna configuration based on the TDD sector setting parameters sent to the first STA.

17. The non-transitory computer-readable medium of claim 11, wherein the operations further comprise causing to send an acknowledgment frame to the response frame, wherein the acknowledgment frame comprises a set sector acknowledgment subfield set to a first value.

18. The non-transitory computer-readable medium of claim 11, wherein the operations further comprise:

determining the TDD sector switch has failed; and determining to revert back to a TX and RX antenna configuration used at a start of the TDD sector switch.

19. A method comprising:

determining, by one or more processors, one or more antenna sector configurations based on time division duplex (TDD) beamforming, wherein the one or more antenna sector configurations are associated with first antenna sectors used to communicate with a first station device (STA);

initiating a TDD sector switch with the first STA to switch from the one or more first antenna sectors to one or more second antenna sectors;

causing to send, to the first STA, an action frame comprising TDD sector setting parameters associated with the TDD sector switch;

identifying a response frame received from the first STA, wherein the response frame comprises the TDD sector setting parameters; and performing the TDD sector switch by switching from the one or more first antenna sectors to the one or more second antenna sectors.

20. The method of claim 19, wherein TDD beamforming comprises establishing a first initiator transmit (TX) antenna sector identification (ID), a first initiator receive (RX) antenna sector ID, a first responder TX antenna sector ID, and a first responder RX antenna sector ID.

* * * * *